Sept. 6, 1955　　　　　M. Z. DAVIS　　　　　2,716,767
VEHICLE WHEEL WASHING APPARATUS
Filed July 27, 1953　　　　　　　　　　　　　　3 Sheets-Sheet 1
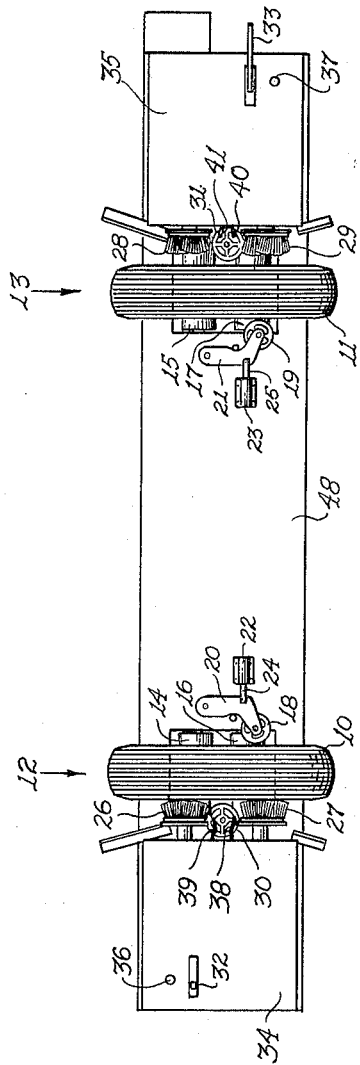
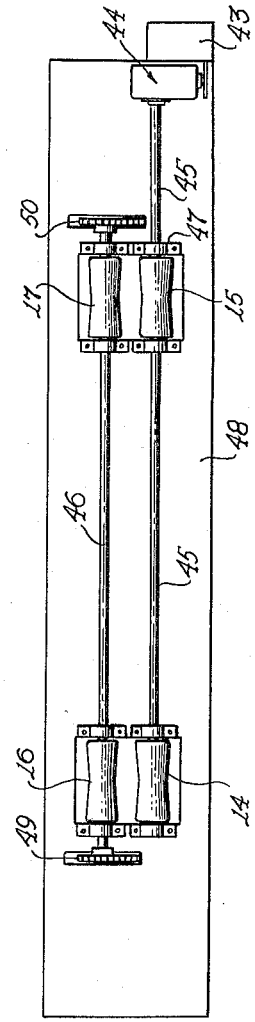
INVENTOR.
MICHAEL Z. DAVIS
BY R. W. Hodgson

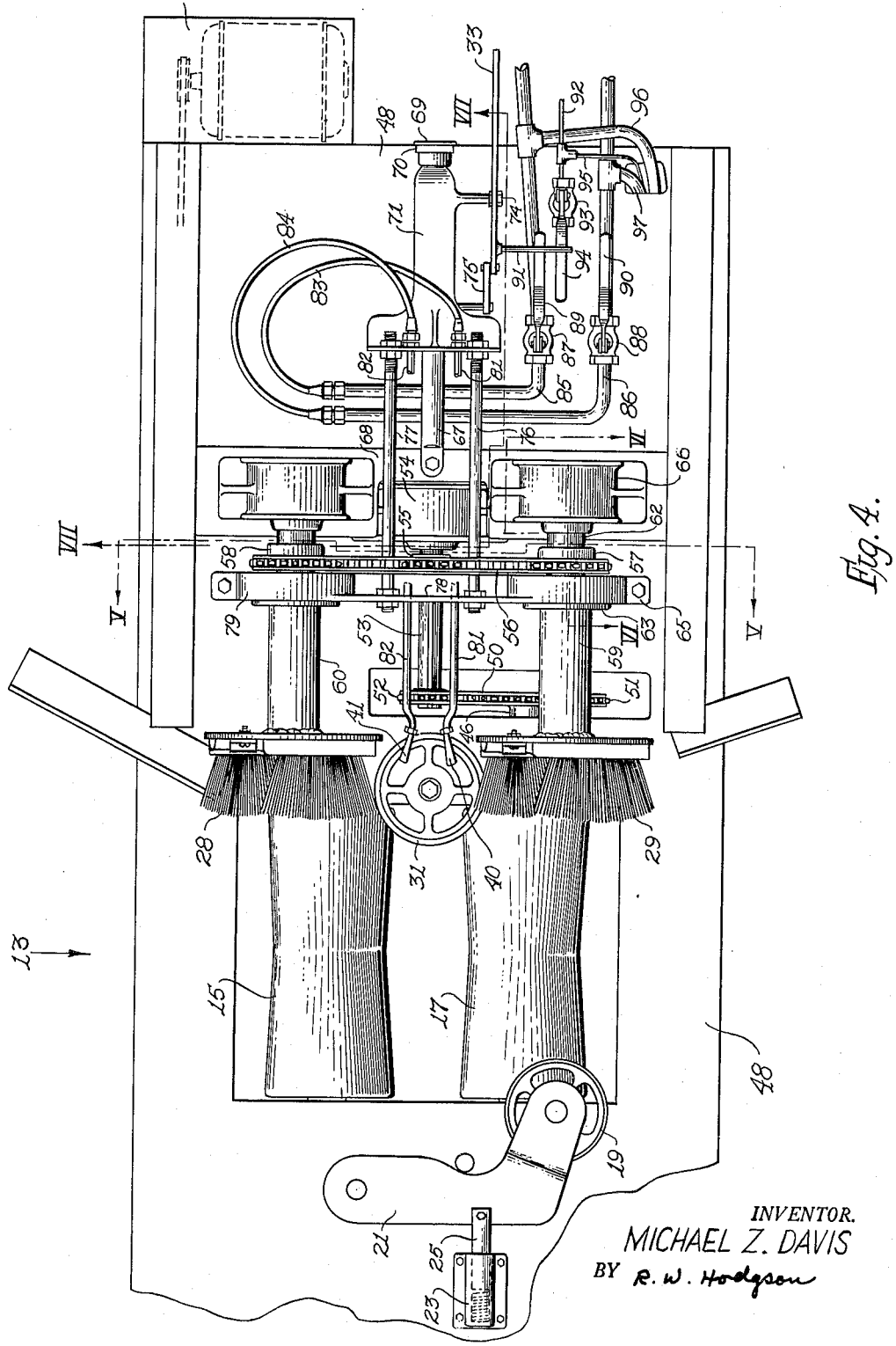

Sept. 6, 1955 M. Z. DAVIS 2,716,767
VEHICLE WHEEL WASHING APPARATUS
Filed July 27, 1953 3 Sheets-Sheet 3
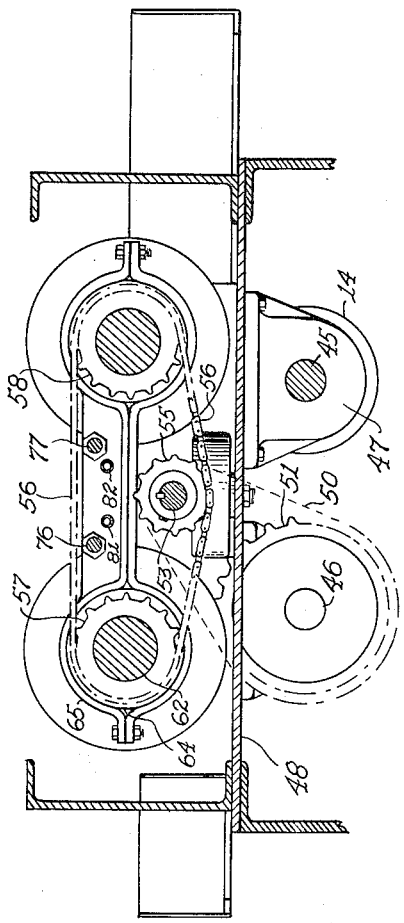
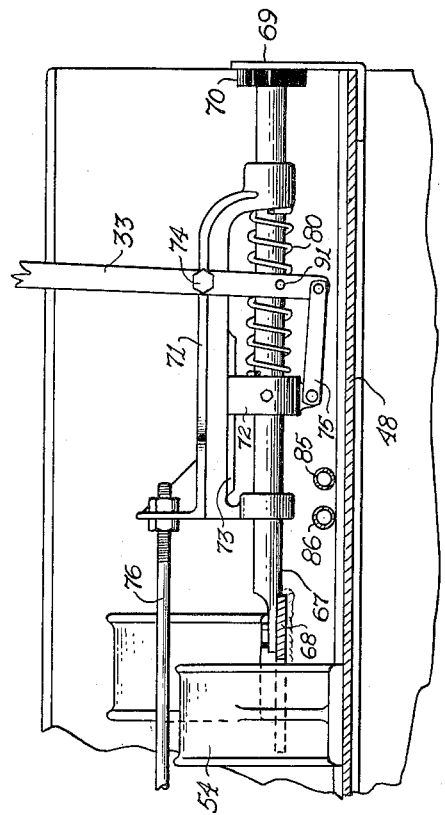
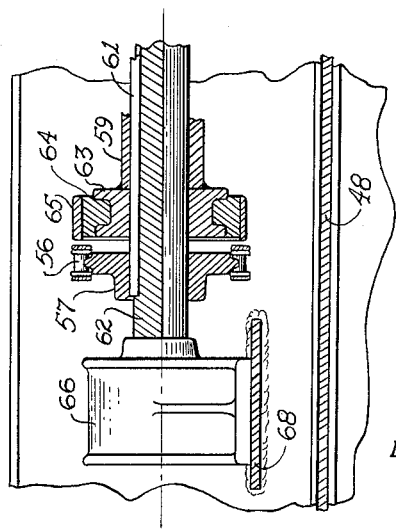
INVENTOR.
MICHAEL Z. DAVIS
BY R. W. Hodgson United States Patent Office 2,716,767
Patented Sept. 6, 1955

2,716,767

VEHICLE WHEEL WASHING APPARATUS

Michael Z. Davis, Beverly Hills, Calif.

Application July 27, 1953, Serial No. 370,404

5 Claims. (Cl. 15—21)

This invention relates generally to wheel washing machines and, more particularly, to a machine for washing wheels on a vehicle proceeding through a vehicle washing apparatus (or line).

There has long been a problem in the car-washing industry of properly washing the wheels of a vehicle; this need being accentuated by the advent of tires with white side-walls, which require a scrubbing action as well as the application of a cleansing soap or detergent solution in order to reacquire the original whiteness and brilliancy of appearance. There have been several attempts in the prior art to develop a machine capable of performing the necessary operations, but each of the resulting devices has at least on major disadvantage.

For example, many of the prior art machines are impractical and virtually inoperative in that the scrubbing action is too soft and/or takes place for too short a period of time to adequately remove the dirt and grime from the white side-walls of the tires. There are several devices that have scrubbing brushes that are continually rotating, thus commonly presenting hazards such as injury to the human operators of the device and damage to the paint and finish on the vehicle as the brushes scratch thereagainst before making contact with wheels and tires (or between the front wheel and rear wheel scrubbing operations).

My invention consists of a vehicle wheel washing apparatus including roller means effectively adapted to support and rapidly rotate a wheel positioned thereon and provided with reciprocatively mounted rotary brush means that are normally stationary and retracted from the wheel but adapted to be automatically rotated upon operative positioning of said wheel upon said roller means and selectively forcibly reciprocated against the outside of said wheel for the scrubbing thereof.

In a preferred embodiment of the present invention, said roller means include a driving roller and a driven roller, said driving roller being constantly rotated by motor means, and said driven roller being normally stationary, said rollers being spatially related with respect to each other so that a wheel will rest upon and partially between said rollers with its periphery in frictional abutment thereagainst whereby the driving roller will cause the wheel to rapidly rotate, which will cause the driven roller to rapidly rotate. In this preferred embodiment, the rotary brush means are cooperably related to said driven roller whereby only rotation of said driven roller causes rotation of said brush means, thereby preventing the rotation of said brush means except when a wheel is operatively positioned against both the driving roller and the driven roller.

In one preferred embodiment of the present invention, there are provided two spray nozzles connected to hoses carrying pressurized liquids, one of said liquids being a solution of a soap, detergent or other cleaning compound in hot water, and the other of said liquids being clear rinsing water; said hoses being provided with valves for selective discharge and retention of said liquids, and said nozzles being directed at the location where the wheel is to be washed.

In this preferred embodiment of the invention, there is provided selectively operable means for rectilinear reciprocation of said brush means into and out of lateral contact with the wheel to be washed. Said selectively operable means being cooperably related to the cleaning solution valve for opening and closing thereof simultaneously with in and out movement, respectively, of said brush means, thereby causing a constant spray of cleaning solution to be discharged upon the side of the wheel as the brushes perform the rotary scrubbing action. The rinsing water valve is selectively openable and closable at any time, independently of the operation of the cleaning solution valve.

From the above brief description, it will be obvious that the above-mentioned, prior art disadvantages are completely or virtually completely overcome in and through the use of my invention.

With the above points in mind, it is an object of my invention to provide a vehicle wheel washing apparatus having scrubbing brush means normally quiescent but automatically operable when a vehicle wheel is operatively positioned upon the apparatus.

It is another object of this invention to provide a vehicle wheel washing apparatus having scrubbing brush means effectively adapted to be rectilinearly reciprocable for selective movement towards and away from the side of an operatively positioned vehicle wheel.

A further object of the present invention is the provision of a vehicle wheel washing apparatus which is ruggedly constructed, simple to operate, fool-proof, easy and inexpensive to maintain, and commercially practical and marketable.

Another object of this invention is the provision of a vehicle wheel washing apparatus having the cleaning solution discharge means and the scrubbing brush means cooperably related to each other for simultaneous operation.

Additional and related objects will be clear to those skilled in the art upon a careful study of the present specification, the accompanying drawings and the appended claims.

In order to facilitate more complete understanding of my invention, reference will be made to the hereinbelow described drawings, in which:

Fig. 1 is a top plan view of a pair of preferred embodiments of the present invention, with vehicle wheels operatively positioned thereon, and with cover plates shielding most of the mechanism;

Fig. 2 is a fragmentary, perspective view of the left hand portion of the apparatus shown in Fig. 1, as seen from the upper left thereof, with the brushes operatively positioned against the wheel;

Fig. 3 is a bottom view of the apparatus illustrated in Fig. 1; the bottom frame plate shielding most of the mechanism but permitting observation of the roller means and the motor means;

Fig. 4 is an enlarged top plan view of the right hand portion of the apparatus shown in Fig. 1, with the cover plate removed to show the main operating mechanism;

Fig. 5 is a transverse partially sectional end view taken substantially along line V—V in Fig. 4;

Fig. 6 is a partially sectional, fragmentary, side view taken substantially along line VI—VI in Fig. 4; and Fig. 7 is an enlarged, fragmentary, side view taken substantially along line VII—VII in Fig. 4.

As seen in Fig. 1, two vehicle wheels 10 and 11 (being part of the vehicle which is not shown for convenience and clarity) have rolled in the direction of the arrows 12 and 13 onto the roller means, said roller means including the driving rollers 14 and 15 respectively, and the driven rollers 16 and 17, respectively. The vehicle wheels 10 and 11 come into lateral contact with the lateral positioning wheels 18 and 19, respectively, which are rotatably mounted to the end of pivotally mounted arms 20 and 21, respectively; said arms being biased towards the vehicle wheels by compressed springs (not shown) inside the spring housings 22 and 23, respectively, and pushing against the rectilinearly reciprocable rods 24 and 25, respectively, which are pivotally mounted to the arms 20 and 21, respectively. The pressure exerted by the lateral positioning wheels 18 and 19 assures the parallel positioning of the vehicle wheel 10 and 11 with respect to the paired scrubbing brushes 26 and 27 and 28 and 29, respectively. The scrubbing brushes 28 and 29 are illustrated in their normal retracted position away from the vehicle wheel 11, whereas the brushes 26 and 27 are illustrated in their operative scrubbing position against the vehicle wheel 10. The rotatable brush-protecting wheels 30 and 31 are so located that they prevent damaging contact of the vehicle wheels 10 and 11, respectively, with the corresponding brushes as said vehicle wheels roll onto the rollers. Selectively operable levers 32 and 33 are cooperably related to the brushes 26 and 27 and 28 and 29, respectively, for rectilinear reciprocation thereof, the lever 32 forward and the lever 33 being retracted in accordance with the illustrated positions of their respective brushes. The levers project through slots in the cover plates 34 and 35. Foot buttons 36 and 37 also project through the cover plates 34 and 35, respectively, and are adapted to be stepped upon for opening of the rinsing water valves (not shown), which will be more fully explained below. The paired cleansing solution and rinsing water discharge nozzles 38 and 39 and 40 and 41, respectively, are illustrated in their fixed positions directed at the sides of the wheels 10 and 11, respectively.

In Fig. 2, the left portion of the apparatus illustrated in Fig. 1 is shown in perspective, thereby showing the positioning of the brushes 26 and 27 against the outer sidewall 42 of the wheel 10 at the lower portion thereof. The brushes will effectively scrub the entire sidewall 42 as the wheel 10 rotates rapidly upon the rollers (not shown). The low positioning of the brushes with respect to the wheel prevents contact of the brushes with the fenders and fender skirts (not shown) of the modern automobile.

Fig. 3 illustrates the drive mechanism and interconnection of the roller means of the left and right side portions of the apparatus illustrated in Fig. 1. The box 43 houses a motor (not shown) connected to a speed reduction gear system, indicated generally at 44, which is connected to the drive shaft 45. The driving rollers 14 and 15 are axially mounted to the drive shaft 45 so as to both be driven by the motor. The driven rollers 16 and 17 are axially mounted to a common shaft 46 for greater stability of operation. Both shafts 45 and 46 are provided with bearing mountings, such as 47, for suspension from the bottom frame plate 48. Both ends of the driven shaft 46 are provided with sprocket wheels and chains 49 and 50, the function of which will be fully explained later.

Fig. 4 shows the right hand portion of the apparatus of Fig. 1 with the cover plate removed to illustrate the details of construction and operation of the device. The driving roller 15 is constantly rapidly rotating, being driven in a manner previously described, and the driven roller 17 is stationary. A vehicle wheel 11 (not shown in this view) rolls onto the rollers 15 and 17 in the direction of the arrow 13 until it is supported by both of said rollers. The weight of the vehicle (not shown) causing a large frictional force between the wheel 11 and the rollers, and the driving roller 15 causes the vehicle wheel to rapidly rotate, which causes the driven roller 17 to rapidly rotate; since the rollers 15 and 17 are virtually identical, the speed of rotation of said rollers will be virtually the same. In Figs. 4 and 5, it can be seen that the sprocket wheel 51 on the end of the driven shaft 46 drives a sprocket chain 50, which drives a sprocket wheel 52 on a shaft 53 mounted in a bearing housing 54, said shaft 53 being provided with another sprocket wheel 55 in engagement with a brush-driving sprocket chain 56 which is in engagement with the brush sprocket wheels 57 and 58 which are in cooperable engagement with the brush shafts 59 and 60, respectively; hence, rotation of the driven roller 17 causes rotation of the scrubbing brushes 28 and 29.

Referring to Figs. 4 and 5 and particularly to Fig. 6, the latter being a sectional view of the mechanism associated with one brush 29 (the mechanism associated with the other brush 28 being identical thereto), it can be seen that a key 61 in a central shaft 62 effectively locks the rotation of the brush sprocket wheel 57 to the brush shaft 59 while permitting rectilinear reciprocation of the brush shaft 59. The brush shaft 59 is provided on one end with a bearing wheel 63 in cooperable engagement with a rotary-and-thrust bearing 64 secured by a clamp or housing 65; the surfaces between the bearing wheel 63 and the bearing 64 may be provided with ball or roller bearings to reduce friction, or any other type of rotary-and-thrust bearing may be used, such bearings being well known in the art. The central shaft 62 is supported on its end by a terminal bearing 66.

In Figs. 4 and 7, it is seen that a shaft 67 is bolted at its front end to an immovable plate 68 and secured at its rear end to another immovable member 69 secured to the bottom frame plate 48. A shock pad 70 is located at the rear end of the shaft 67. A rigid member 71 is slidably mounted to the shaft 67 restilinear reciprocation thereon. A round member 72 is immovably secured to the shaft 67 and provided with a keyway (not shown) in slidable engagement with a key projection 73 from the member 71. The lever 33 is pivotally secured to the rigid member 71 by a bolt 74; a linkage arm 75 is pivotally secured at its ends to the lever 33 and the round member 72. Two long bolts 76 and 77 are secured at their ends to the rigid member 71 and the plate 78 which is an integral part of the thrust bearing housings 65 and 79. In the normal position of the lever 33 illustrated in Fig. 4, the rigid member 71 is forcibly maintained against the shock mounting 70 by the coil spring 80 shown in Fig. 7. In Fig. 7, however, the lever 33 has been manually thrown forward, thus sliding the rigid member 71 on the shaft 67 and thereby moving the brush assembly forward for scrubbing contact of the brushes 28 and 29 with the vehicle wheel.

Fig. 4 shows the discharge nozzles 40 and 41 connected to rigid pipes 81 and 82, respectively, which are secured to the rigid member 71 so that they will be rectilinearly reciprocable simultaneously with the brushes 28 and 29. The flexible hoses 83 and 84 connect the pipes 81 and 82, respectively, to the pipes 85 and 86, respectively, which are provided with spring valves 87 and 88, respectively, having handles 89 and 90, respectively. The valves 87 and 88 are normally closed by the action of their internal springs (not shown), as is well known in the art, and the handles 89 and 90 are normally up. The lateral extension 91 on the lever 33 rests in abutment against the handle 89 whereby forward movement of the lever 33 causes substantially downward movement of the lateral extension 91 which causes downward movement of the valve handle 89 which opens the valve 87 and permits discharge of the cleaning solution from the nozzle 40 against the vehicle wheel (not shown) positioned on the rollers 15 and 17. The foot button 37 in Fig. 1 is provided with a vertical finger (not shown) which rests in abutment against the handle 90 so that stepping upon said button causes downward movement of the handle 90 which opens the valve 88 and permits discharge of the rinsing water from the nozzle 41 against the vehicle wheel. A tube 92 carries oil under pressure and is provided with a spring valve 93 having a handle 94 and operating in the same manner as and simultaneously with the cleaning solution valve 87. Part of the oil tube (not shown) extends to the sprocket chain 56 for oiling thereof, and the tube 95 extends under the bottom frame plate 48 to the vehicle wheel washing apparatus on the left side in Fig. 1 for the same purpose, said line 95 being provided with identical devices as illustrated in Fig. 4. The tubes 96 and 97 also extend to the apparatus on the left side in Fig. 1, and are provided with identical devices that are independently operated in the same manner as hereinabove described.

It should be noted that numerous modifications of my invention within the spirit thereof will be apparent to those skilled in the art, and that all such devices, entitled to application of the doctrine of equivalents, are intended to be included and comprehended herein.

I do not intend to limit my invention to the specific embodiment described and illustrated, which has been used for exemplary purposes only. My invention is to be limited only by the appended claims.

I claim:

1. Vehicle wheel-washing apparatus, including: a source of power; driving roller means being effectively cooperable to be driven by said power; rotatable driven roller means being spatially related to said driving roller means for support of a vehicle wheel in frictional abutment against both of said roller means whereby said vehicle wheel may be rapidly rotated by said driving roller means; normally stationary brush means being rotatedly and rectilinearly reciprocably movable; rotary force-transmission means cooperably related to said driven roller means and said brush means whereby rotation of said vehicle wheel causing rotation of said driven roller means causes rotation of said brush means; and selectively operable means for rectilinear reciprocation of said brush means into and out of lateral contact with said vehicle wheel.

2. Vehicle wheel-washing apparatus, including: power means; constantly rotating driving roller means being powered by said power means; rotatable driven roller means being spatially related to said rotating driving roller means for support of a vehicle wheel in frictional abutment against both of said roller means whereby said driving roller means may rotate said vehicle wheel which may rotate said driven roller means; brush means cooperably related to said driven roller means whereby rotation of said driven roller means causes rotation of said brush means; and selectively operable means for rectilinear reciprocation of said brush means into and out of lateral contact with said vehicle wheel.

3. Vehicle wheel-washing apparatus, including: power means; rotating driving roller means being driven by said power means; rotatable driven roller means being spatially related to said rotating driving roller means whereby a vehicle wheel may be supported by both of said roller means in frictional abutment thereagainst, said driving roller means thereupon causing rotation of said vehicle wheel which causes rotation of said driven roller means; rotary brush means being in cooperable force-transmission relationship with respect to said driven roller means whereby rotation of said driven roller means causes rotation of said brush means and selectively rectilinearly reciprocable means for forcible movement of said brush means into and out of lateral scrubbing contact with said vehicle wheel.

4. Vehicle wheel-washing apparatus effectively arranged to be operable for washing the wheel of a vehicle proceeding along a car-washing line only when said wheel is operatively positioned, including: power means; constantly rotating driving roller means being driven by said power means; rotatable driven roller means being spatially related to said rotating driving roller means whereby a vehicle wheel may be supported by both of said roller means in frictional abutment thereagainst, said driving roller means thereupon causing rapid rotation of said vehicle wheel which causes rotation of said driven roller means; rotary brush means being effectively geared to said driven roller means whereby rotation of said driven roller means causes rotation of said brush means; rectilinearly reciprocable means for forcible movement of said brush means into and out of lateral scrubbing contact with said vehicle wheel; and a selectively manually openable lever being cooperably related to said rectilinearly reciprocable means for forcible actuation thereof.

5. Vehicle wheel-washing apparatus effectively arranged to be operable for washing the wheel of a vehicle proceeding along a car-washing line only when said wheel is operatively positioned, including: power means; constantly rotating driving roller means being driven by said power means; rotatable driven roller means being spatially related to said rotating driving roller means whereby a vehicle wheel may be supported by both of said roller means in frictional abutment thereagainst, said driving roller means thereupon causing rapid rotation of said vehicle wheel which causes rotation of said driven roller means; rotary brush means being effectively geared to said driven roller means whereby rotation of said driven roller means causes rotation of said brush means; rectilinearly reciprocable means for forcible movement of said brush means into and out of lateral scrubbing contact with said vehicle wheel; pressurized liquid discharge nozzle means effectively adapted to laterally spray said vehicle wheel; valve means cooperably related to said nozzle means for the release and retention of the pressurized liquid; and a selectively manually operable lever being cooperably related to said rectilinearly reciprocable means and to said valve means for the forcible actuation thereof.

References Cited in the file of this patent

UNITED STATES PATENTS

| | | |
|---|---|---|
| 1,412,732 | Young | Apr. 11, 1922 |
| 2,025,780 | Rosebrook | Dec. 31, 1935 |